United States Patent [19]
Schröder

[11] Patent Number: 5,133,600
[45] Date of Patent: Jul. 28, 1992

[54] METHOD AND APPARATUS FOR DEMODULATING THE ROTATION RATE SIGNAL OF A FIBER OPTIC GYROSCOPE

[75] Inventor: Werner Schröder, Eltenheim, Fed. Rep. of Germany

[73] Assignee: LITEF GmbH, Freiburg im Breisgau, Fed. Rep. of Germany

[21] Appl. No.: 531,925

[22] Filed: Jun. 1, 1990

[51] Int. Cl.⁵ ............................................. G01C 19/72
[52] U.S. Cl. .................................................. 356/350
[58] Field of Search ............................ 356/350, 345; 250/227.27

[56] References Cited

FOREIGN PATENT DOCUMENTS

| 0160450 | 11/1985 | European Pat. Off. |
| 3140110 | 4/1983 | Fed. Rep. of Germany |
| 3204810 | 8/1983 | Fed. Rep. of Germany |
| 3401640 | 7/1984 | Fed. Rep. of Germany ...... 356/350 |
| 2108652 | 5/1983 | United Kingdom |

OTHER PUBLICATIONS

"Fiber Optic Laser Gyro Signal Detection and Processing Technique", Martin et al., SPIE vol 139, 1978, pp. 98–102.

Primary Examiner—Samuel A. Turner
Attorney, Agent, or Firm—Elliott N. Kramsky

[57] ABSTRACT

A method and device for reading out a fiber gyroscope based on the concept of determining, by gating the light signal for particular time intervals, only one particular phase section of the read-out signal of a photodetector of the fiber optic gyroscope modulated with a periodic function. Further phase sections are determined in sequence and cyclically in the same manner so that the entire photodetector signal is detected after one full cycle. Signals associated with individual phase sections are averaged separately and processed to obtain a rotation rate-proportional signal. The read-out signals can also be processed so that a control signal for deviation of the phase modulator is obtained and/or the gyroscope scale factor is stabilized.

19 Claims, 8 Drawing Sheets

METHOD AND APPARATUS FOR DEMODULATING THE ROTATION RATE SIGNAL OF A FIBER OPTIC GYROSCOPE

BACKGROUND

1. Field of the Invention

The present invention relates to a method and apparatus for demodulating the read-out signal of a fiber gyroscope. More particularly, the invention pertains to demodulation of a fiber-optical Sagnac interferometer for measuring rotation rate.

2. Description of the Prior Art

Previous demodulation methods for the reading out the signal from a fiber optic gyroscope have exhibited a number of technical problems in practice. Such problems have been particularly evident in non-restored gyroscopes.

The most frequent readout technique by far for fiber-optic gyroscopes (both interferometer and resonator), phase or frequency modulates the light in the gyroscope by means of a modulator. The optoelectrical output signal(s) is (are) then synchronously demodulated, (i.e., multiplied by a signal having a fixed phase relationship to the modulation signal) and then lowpassfiltered. The signal thus obtained provides a measure of the rate of rotation.

The dynamic range required for the demodulator (particularly in the case of non-restoring gyroscopes) is extremely high, often exceeding six decades. The commonly required high frequency of 100 kHz raises extremely difficult technical problems in the construction of a demodulator meeting such requirements.

A number of other problems, hitherto unsolved, or requiring extremely high technical expenditures, are also encountered in this area. These include:

(1) The gyroscope modulation or its harmonics (e.g., from a digital drive) reach the input of the demodulator by induction and appear as offset errors due to the synchronous demodulation.

(2) Fast synchronous demodulators are essentially constructed of FET switches. Accordingly, their precision is effected by error terms caused by charge carrier injection during the switching processes.

(3) In square wave modulation and demodulation, a high degree of sensitivity to changes in the phase difference between the modulation signal and the signal supplied to the demodulator as a reference occurs.

(4) In practice, digital synchronous demodulation, (i.e., the reading-in of the rate-of-rotation dependent signal of the fiber-optic gyroscope, obtained via a photodetector with high repetition rate and subsequent digital synchronous demodulation) cannot be achieved with high accuracy in the case of non-restored gyroscope arrangements. This results from the fact that A/D converters are required that must be very fast and have high resolution and linearity due to the wide dynamic range. Such A/D converters are not presently available.

(5) In most cases, an amplitude modulation (lost modulation) is associated with a phase or frequency modulation of the light signal in the fiber-optic gyroscope. This may limit or gate out parts of the photodetector signal. Unfortunately, the electronic gating circuits can introduce errors due to charge carrier injection or unsatisfactory gating.

SUMMARY AND OBJECTS OF THE INVENTION

It is therefore an object of the present invention to provide both a demodulation method and apparatus for a fiber-optic gyroscope.

Another object of this invention is to achieve the above object so that the rotation rate signal, particularly in the case of a fiber-optic Sagnac interferometer, can be obtained in a way that is easily controllable.

Yet another object of the present invention is to achieve the above objects so that the rotation rate signal can be obtained either directly or utilized to control the restoring sections of the evaluation electronics of a restoring-type gyroscope.

The preceding and other objects are addressed by the present invention that provides, in one aspect, an improvement in the method for demodulating the rotation rate signal of a fiber-optic gyroscope in which partial light beams are obtained from a light source by splitting a light beam and are irradiated into a fiber coil in opposite directions and subjected to a periodic phase modulation. The improvement in such method involves periodically gating the read-out signal of the fiber gyroscope prior to demodulation so that, during a first time interval corresponding to an integral multiple of the period of the phase modulation signal, only a predetermined first section of the periodic gyroscope output signal occurs for further processing by an electronic evaluation circuit. The gating of the read-o out signal is controlled so that, after the first time interval, during a second or, if necessary, further successive time intervals, in each case corresponding to an integral multiple of the period of the phase modulation signal, only a second or, if necessary, successively in each case only one further phase section of the periodic gyroscope signal occurs so that, after a plurality, corresponding to the number of individual phase sections of gating sequence cycles, an entire set of periods composed of the individual phase sections of the gyroscope output signal is detected and subsequently further sets of periods continuously in an analogous way. The method averages the output signals of, in each case, one phase section detected by the gating process over the period of the respective time interval and then matches the demodulation to the gating sequence cycles from the averaged signals of the individual phase sections to obtain a rotation rate-proportional signal.

When phase modulation of the signal in the fiber gyroscope is mentioned, in this definition of the concept of the invention, the term also includes frequency modulation depending on the situation.

The invention is based on the inventor's finding that the generally high gyroscope bandwidth, obtained, particularly in the case of an interferometer, from rapid gyroscope modulation required for other reasons, is not needed for the gyroscope output signal or for the rotation rate signal. In other words, by transforming the readout signal to a lower frequency range prior to demodulation, a read-out principle results that addresses the practical problems much better and can be inexpensively implemented in mass production due to the potentially large digital content of the evaluating electronics.

In another aspect of the invention there is provided an improvement in a demodulator for the rotation rate signal of a fiber optic gyroscope, particularly a Sagnac interferometer, of the type in which a light beam emanating from a light source is conducted via a fiber-optic path and passes through a first directional coupler, an output of which is connected to a photodetector for the read-out signal and is split in a second directional coupler into two partial light beams that are radiated into a fiber coil in opposite directions and are periodically modulated by a phase modulator driven by a modulation signal generator, and in which the readout signal of the photodetector is demodulated and output directly as rotation rate or used as a restoring signal in gyroscope electronics. The improvement that is provided by the invention includes a switching signal generator for periodically gating the exciter signal of the light source so that, during a first time interval that corresponds to an integral multiple of the period of the phase modulation signal, only a particular first phase section of the periodic output signal of the gyroscope occurs for further processing by the demodulation and evaluation circuit. A logic circuit is provided for triggering the switching signal generator so that, after the first time interval, during a second time interval or, if necessary, during successive further time intervals, in each case corresponding to an integral multiple of the period of the phase modulation signal, only a second, or successively in each case only one further phase section of the periodic interferometer signal occurs so that after a plurality of gating sequence cycles corresponding to the number of individual phase sections detected, an entire period composed of the sequence of phase sections of the gyroscope output signal is detected and subsequently further periods continuously in an analogous way. The duration of such periods, in accordance with the number of gating pulses per phase section, is much longer than the period of the phase modulation signal. Means are provided for averaging the output signals of the phase sections detected by the gating process over the period of the respective time interval. Finally, a demodulator is provided that is synchronized to the gating sequence to obtain the rotation rate signal.

The signal for successive time intervals corresponding to phase sections of the gyroscope's periodic output signal is low-pass filtered, and, after removal of unwanted fundamental-oscillation components (if required) is then available for demodulation as a readout signal having a fundamental frequency much lower than the generally-very high frequency of the phase modulation in or at the fiber coil. In principle, the lower frequency of the read-out signal can be selected arbitrarily. Individual time intervals or periods of between 100 μs and 1 ms can be specified as guide values for a periodic cycle of the sampling of the individual phase sections.

The foregoing and other features of this invention will become further apparent from the detailed description that follows. The written description is accompanied by a set of drawing figures. Numerals of the drawing figures, corresponding to those of the written description identify the features of the invention, like numerals referring the like features throughout both.

DETAILED DESCRIPTION

Figure 1:
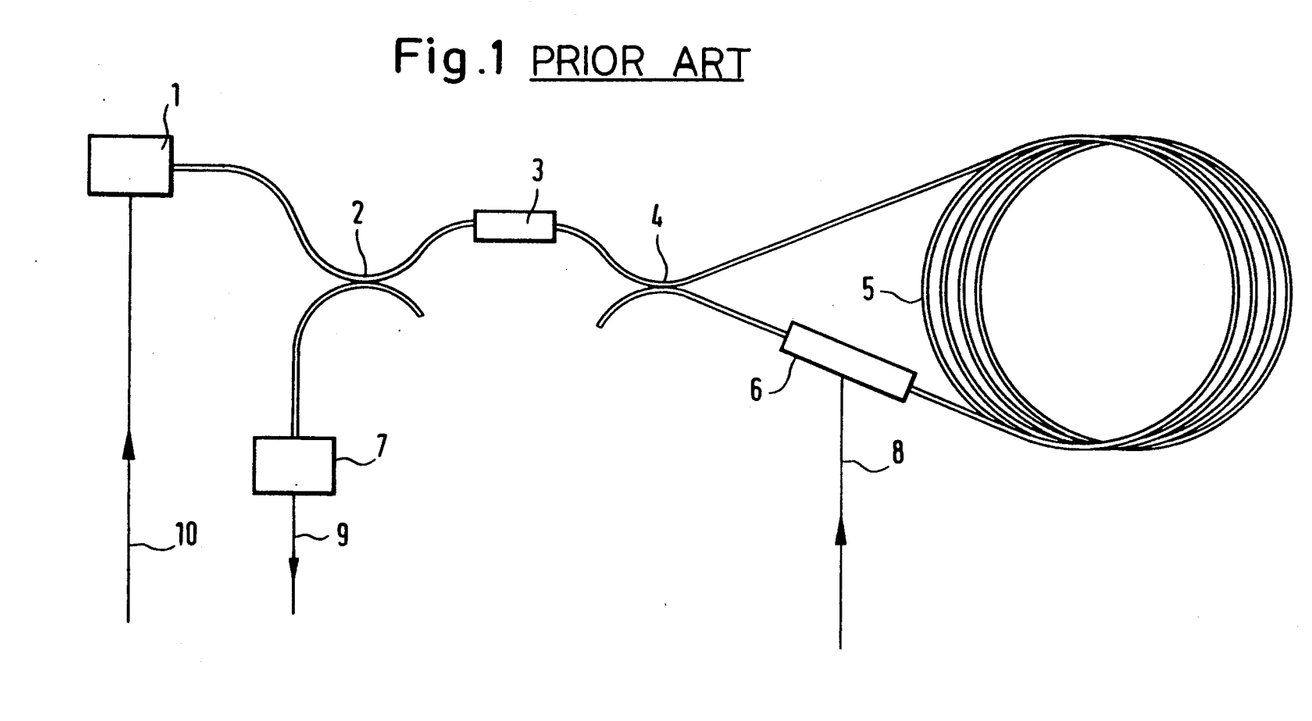
FIG. 1 is a schematic diagram of a basic fiber-optic gyroscope of the Sagnac interferometer type.

The principle of the demodulation method of the invention will first be explained with reference to the fiber gyroscope interferometer shown schematically in FIG. 1 in conjunction with the waveforms of FIGS. 2a to 2h and the demodulator of FIG. 3.

Light from a source 1 passes through a first directional coupler 2, a polarizer 3 and is then split in a second directional coupler 4 into two partial light beams that pass in opposite directions through a fiber coil 5. Both of the partial light beams are phase modulated in a modulator 6 that is preferably attached to one end of the fiber coil 5. A drive signal 8 is applied to the phase modulator 6 producing generally time-dependent phase modulation. As the consequence of such modulation and of the Sagnac phase $\Phi_s$ resulting from an inertial rate of rotation $\Omega$, a read-out signal I(t) is obtained in a read-out channel 9 at a photodetector 7 connected to the directional coupler 2. The current i(t) for operating the light source 1 is supplied via a conductor 10.

The following is a good approximation of the transfer function of the interferometer gyroscope:

$$I(t) = I_0 (1 + \cos(\Phi_2 + \Phi(t) - \Phi(t-\tau))) \quad (1)$$

with the Sagnac phase $$\Phi_s = \frac{4\pi \cdot L \cdot R}{\lambda \cdot c} \cdot \Omega \quad (2)$$

where $I_0$ designates a constant light intensity due to the constant current level i0 of the light source, r is the transit time of the light through the fiber coil 5, L is the length of the fiber coil 5, R is the mean radius of the fiber coil 5, $\lambda$ is the mean wavelength of the light of the source I and c is the velocity of light in a vacuum.

In general, either a laser diode or a superluminescent diode (SLD) is employed as the light source 1 of an interferometer gyroscope. Both of such sources have very high bandwidths of greater than 1 GHz. Application circuits with several 100 MHz bandwidths are known. The light source 1 (diode) can thus be rapidly switched on and off. As proposed by the invention, it is thus possible to operate the source 1 via the current conductor 10 to gate the necessary light signals in the gyroscope on and off.

Figure 2A:
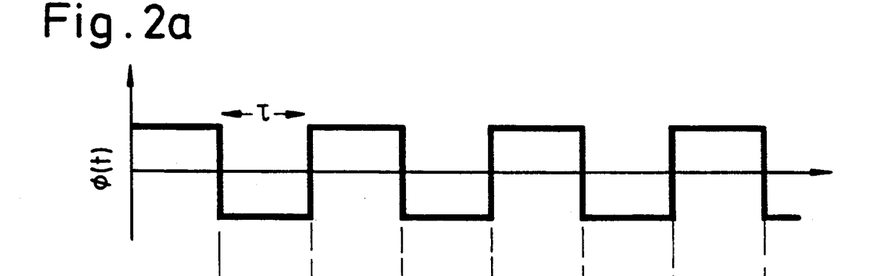
FIGS. 2a through 2h are a series of waveforms taken at various portions of the fiber-optic gyroscope of FIG. 1 and of an exciter and demodulator circuit as shown in FIG. 3.
Figure 2B:
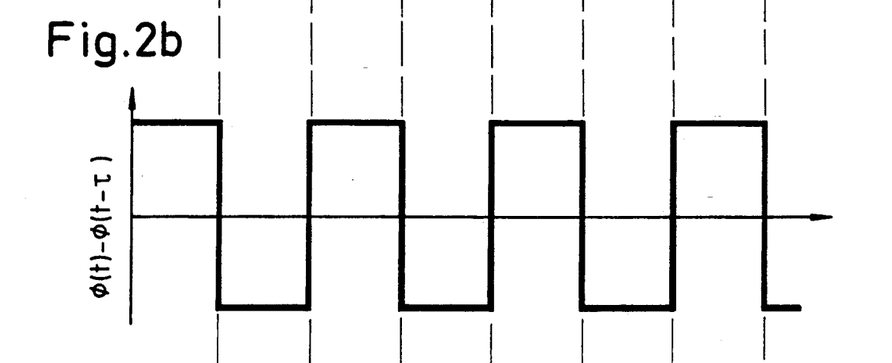
Figure 2C:
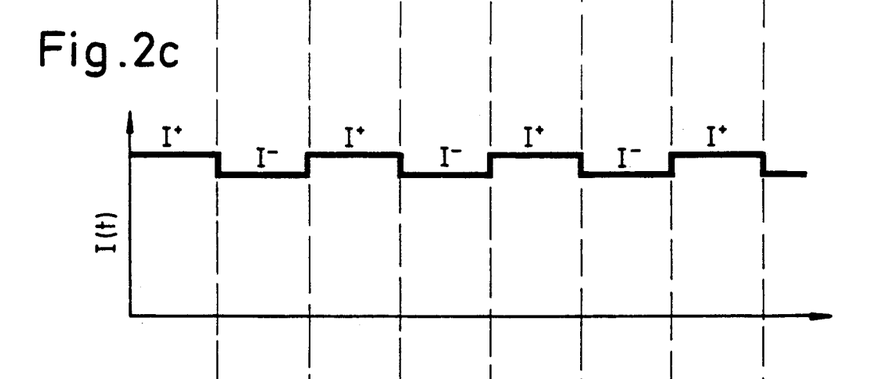

The waveform of FIG. 2a illustrates the drive signal of the phase modulator 6 in the case of a square wave signal drive at the approximately optimum frequency $\tau$ (i.e., the frequency at which the transit time of the light through the fiber 5 corresponds to one half of the period of the modulation frequency.) The waveform of FIG. 2b shows the phase difference $\Delta\phi$ in the gyroscope resulting from such modulation. The waveform of FIG. 2c illustrates the time variation of the read-out signal I(t) of the photodetector 7 (photodiode) when a rotation rate is present.

In synchronous demodulation, two successive signals I+ and I− are compared with one another and their difference is interpreted as phase difference. This is done directly as rotation rate in non-restored gyroscopes and as restoring error or correction signal in restored gyroscope arrangements. The basic concept of the invention is to drive the light source with a gated signal i(t) cyclically in such a manner that the signal I+ occurs and then I− for a particular time interval that corresponds to a multiple of the period of the modulation signal and, has a duration for example, of 100 $\mu$s to 1 ms.

Figure 2D:
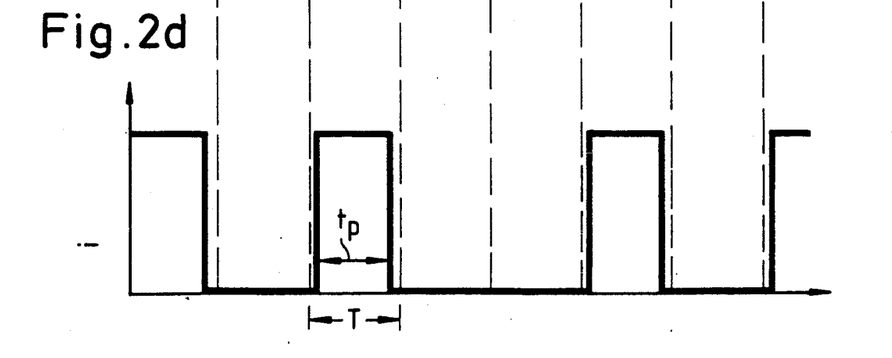
Figures 2E, 2F:
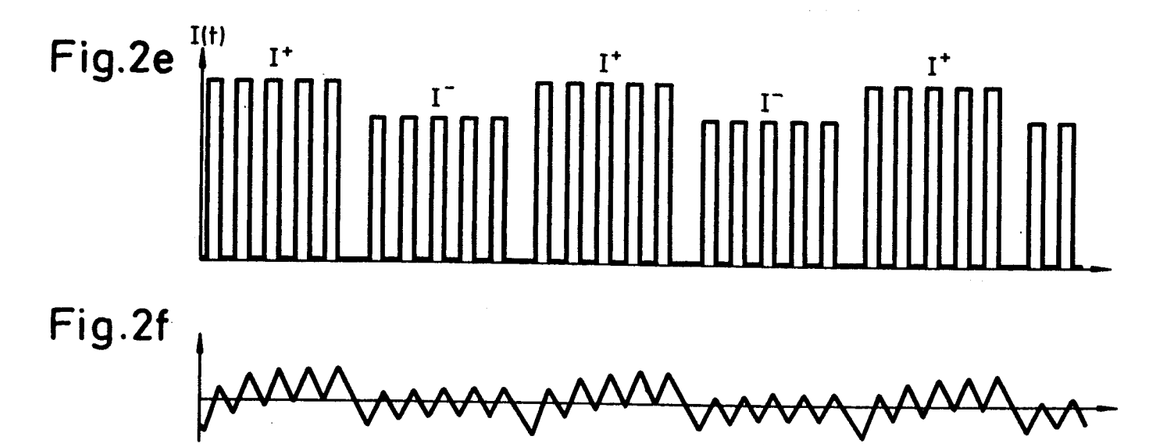

The waveform of FIG. 2d shows the signal sequence required at the conductor 10 for driving the light source 1. This sequence is generated by a generator 16 (shown schematically in FIG. 3) that is appropriately triggered by a logic circuit 15. The resultant sequence on the line 9 of the read-out signal from the photodetector 7 is illustrated by the waveform of FIG. 2e. Such signal first passes to a low-pass filter 11. The d.c. component of the signal is removed by capacitor coupling 12, and the signal is then fed to a square wave demodulator 13 that is synchronized with the (relatively slow) alternation of the phase of the pulses of the SLD gating. The waveform of FIG. 2f shows the signal after the capacitor coupling 12 and that of FIG. 2h shows the reference signal of the square wave demodulator 13.

A square wave frequency generator 17 drives the phase modulator 6 with the modulation signal shown in FIG. 2a through a conductor 8.

Figure 2G:
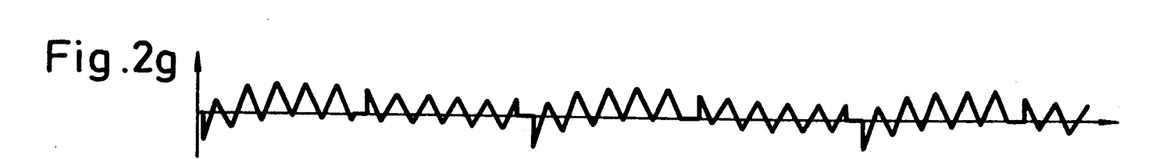
Figure 2H:
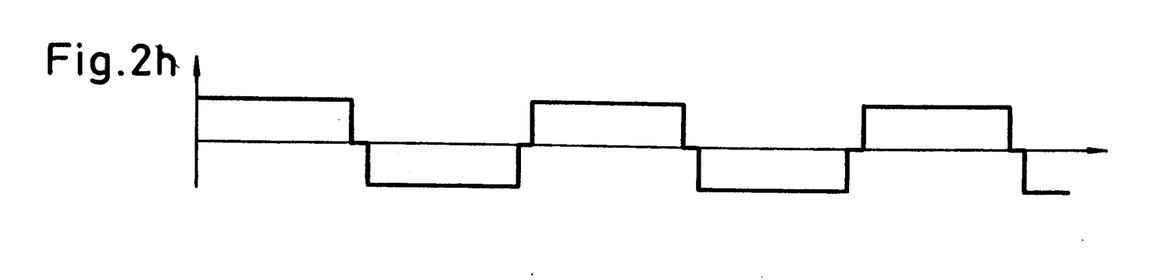

The product of the signals of FIGS. 2f and 2h, namely the waveform FIG. 2g, is obtained as the output of the square wave demodulator. This signal is passed through a low-pass filter 14 leaving a rotation rateproportional signal 18.

Relatively slow (low frequency) demodulation as just described, can be achieved with a relatively inexpensive demodulator chip that operates with high zero-point stability and linearity at the appropriate low frequencies. The demodulator chip AD 630, an analog demodulator, is an example of a chip that is well suited for and has been successfully utilized in the invention.

Only the phase relationship and not the signal shape or amplitude (light intensity of the source, light amplitude) may change with a phase change of the light source gating to avoid assymetries in the demodulation method. However, long-term fluctations are not significant. This requirement can be easily met by suitable known stabilization measures.

As is well known to those skilled in the art, the generator 16 that provides the light source pulses should run independently of the other electronics; an appropriate trigger signal is obtained from the logic circuit 15 for synchronization purposes only.

To eliminate other influences, such as oscillations of the phase modulator 17 when it is fabricated in integrated optics and certain clock time variations, it is useful to select the pulse time $t_p$ (See FIG. 2d) to be slightly shorter than one half of the period of the modulation signal.

In the case of a restoring-type gyroscope, the output signal 18 may be supplied to a regulator (not shown) that regulates suc signal.

Due to the low demodulation frequency, digital demodulation methods are quite possible.

Figure 4A:
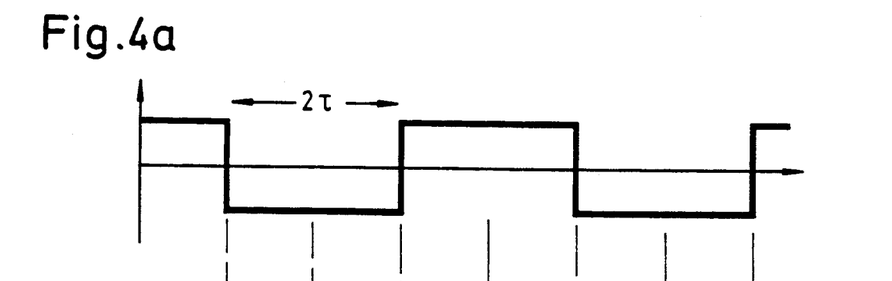
FIGS. 4a through 4d are a series of waveforms, modifying FIG. 2, that illustrate the signal variations in accordance with an alternative method of modulation of the gyroscope signal.
Figure 4B:
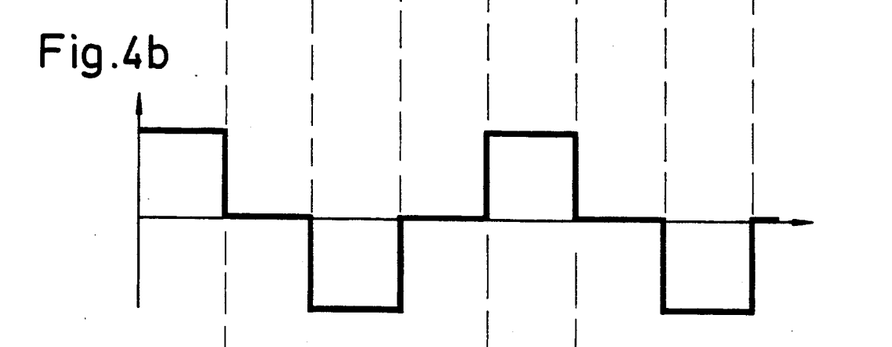
Figure 4C:
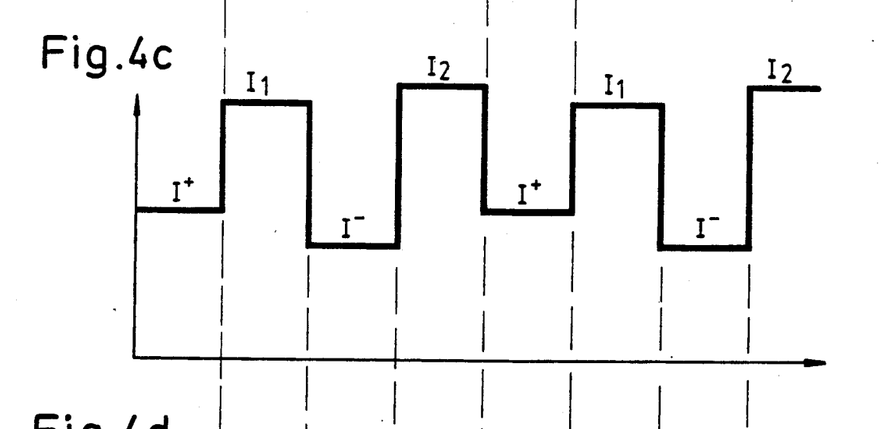
Figure 4D:
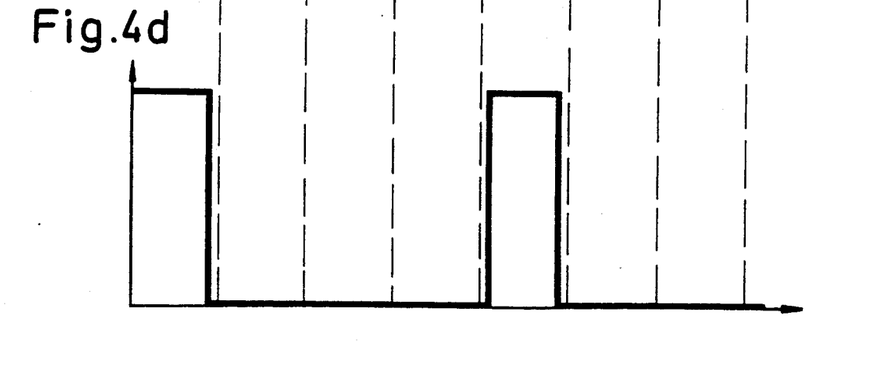
Figure 5:
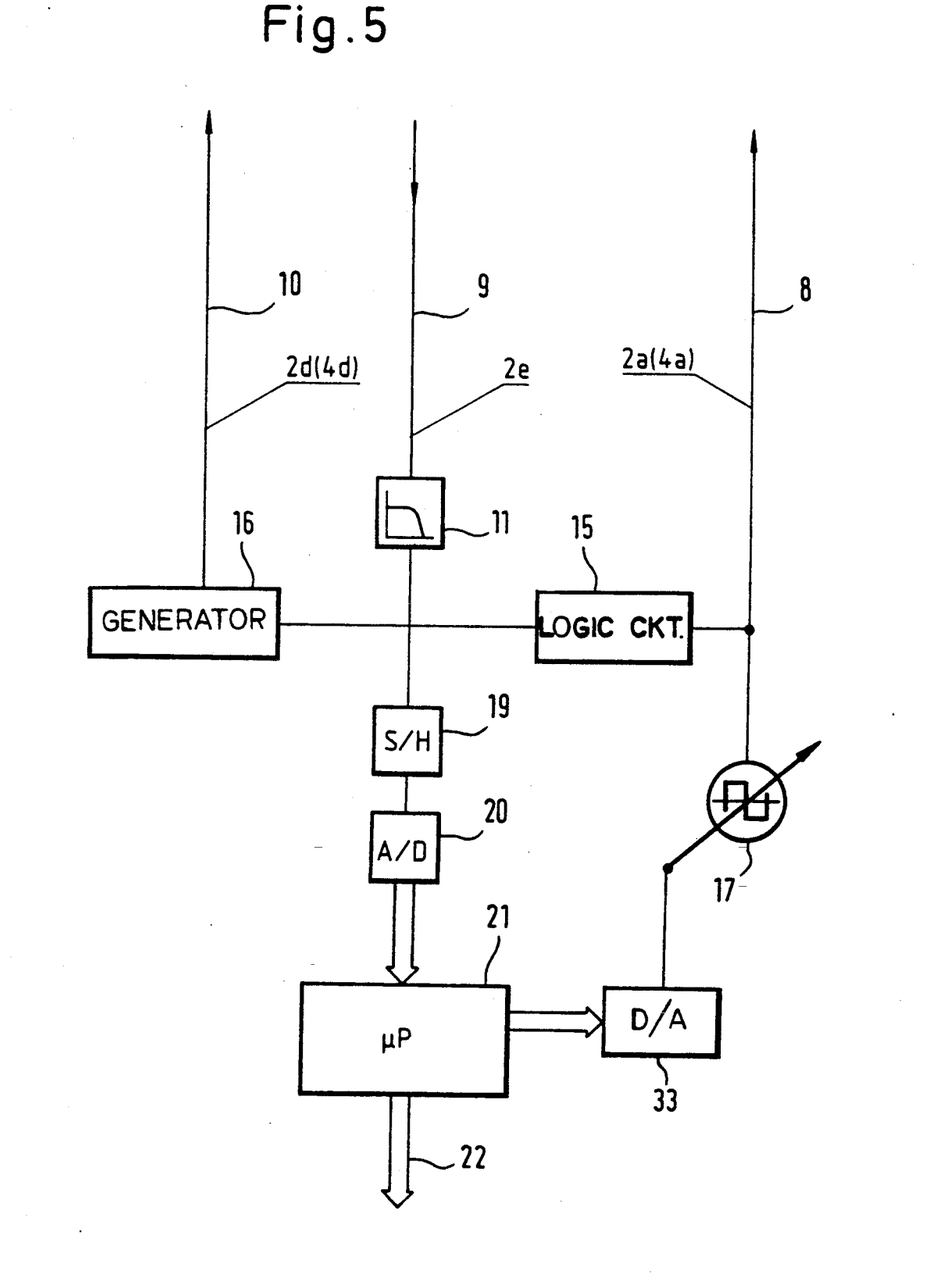
FIG. 5 is a schematic diagram of a digital demodulator in accordance with an alternative embodiment of the invention.

FIG. 5 is a schematic diagram of a digital demodulator in accordance with an alternative embodiment of the invention. The circuit of FIG. 5 can be operated with the signal sequence illustrated in FIGS. 2a to 2f and with that illustrated in FIGS. 4a to 4d (or FIG. 7a described infra).

Figure 3:
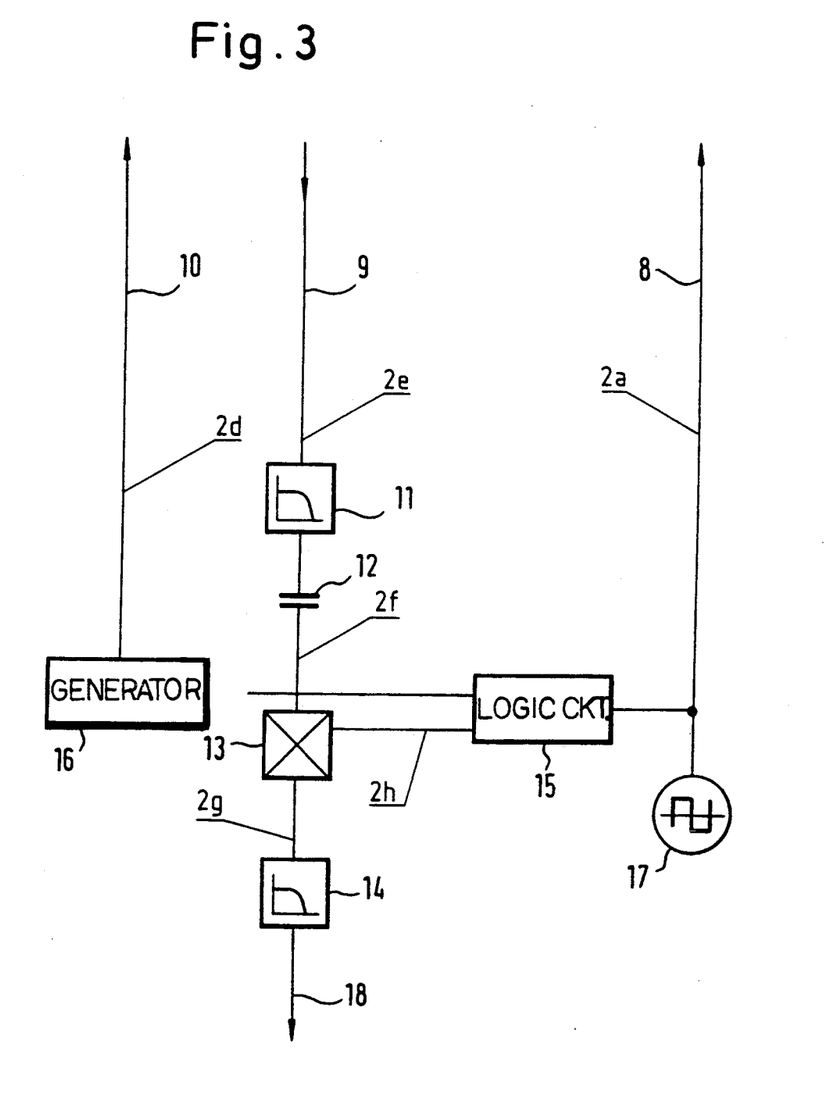
FIG. 3 is a schematic diagram of a demodulator circuit with associated light source pulse exciter circuit adapted to a fiber-optic gyroscope as in FIG. 1.

The difference between the circuit of FIG. 5 and that of FIG. 3 lies in the fact that the signal which is applied to low-pass filter 11 is supplied via a sample-and-hold circuit 19 to an analog/digital converter 20 and is then processed by a signal processor 21. The signal processor 21 carries out the same function as the square wave demodulator 13. However, the signal processor 21 can also digitally filter additional signals and, in some circumstances, take over the function of the logic circuit 15 of the phase modulator 17 and the generator 16 for the light source drive. The signal processor 21 supplies a digital output signal 22 that can either be directly output and displayed as a rotation rate proportional signal or can be supplied to a restoring controller For non-restored gyroscope arrangements, it is generally necessary to provide additional scale factor stabilization. One possibility for accomplishing this is using the basic idea of the method of the invention, can be illustrated with reference to FIGS. 4a to 4d, FIG. 7a 1 (signal variation) and the circuit of FIG. 5.

Figure 7A:
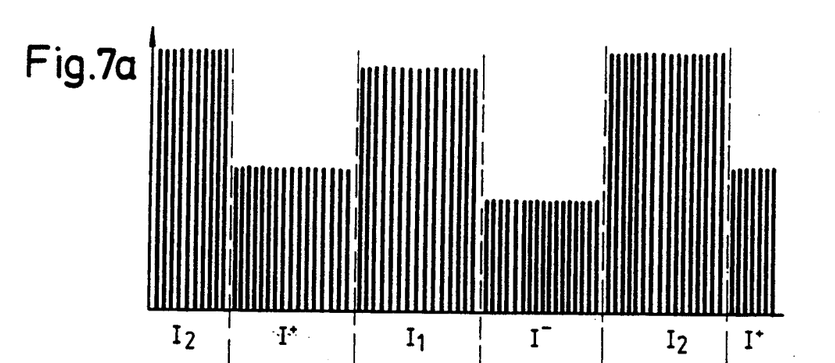
FIGS. 7a through 7g are a series of waveforms that illustrate the method of operation of the invention in accordance with the embodiment of FIG. 6.
Figure 7B:
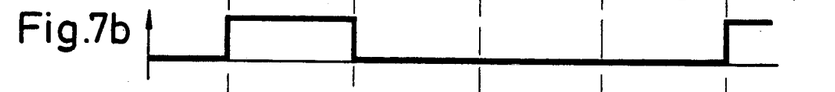
Figure 7C:
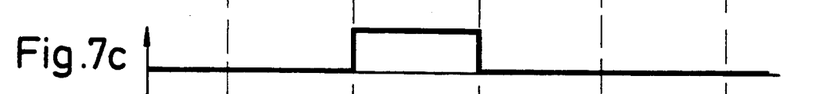
Figure 7D:
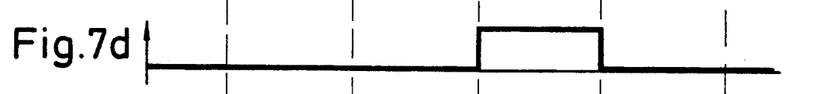
Figure 7E:
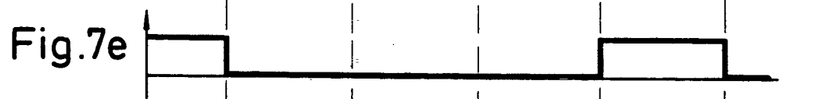

The gyroscope modulation frequency corresponds to one half of the optimum gyroscope frequency (i.e., the period of the drive signal on the conductor 8 (FIG. 4a) of the phase modulator 6 is about four times as great as the transit time $\tau$ of the light through the fiber coil 5.) A signal according to FIG. 4b is then obtained as the phase difference $\Delta\Phi = \Phi(t) - \Phi(t-\tau)$. With continuous operation of the light source 1 and a particular rotation rate, the signal of FIG. 4c is obtained as the read-out signal on the conductor 9. In the invention, however, the light source 1 is gated by the generator 16 (drive signal of FIG. 4d) so that only a signal I+ appears at the photodetector 7 for a particular time interval, then $I_1$ and I− and finally $I_2$ and, beginning anew, I+, etc. A signal is then obtained on the conductor that is shown in FIG. 7a. Such signal is low-pass filtered in 11 and read into the signal processor 21 via the sample-and-hold circuit 19 and the analog/digital converter 20. This signal is calculated as follows:

Let the phase modulator 6 produce the divation $\Phi_M$, then $$I+ = I_0(1 + \cos(2\Phi_M + \Phi_s))$$

and $$I- = I_0(1 + \cos(-2\Phi_M + \Phi_s)).$$

The following is obtained with a linear amplitude modulation characteristic for the phase modulator 17:

$$I_1 = (I_0 + \Delta I) \cdot (1 + \cos(\Phi_s))$$

and $$I_2 = (I_0 - \Delta I) \cdot (1 + \cos(\Phi_s))$$

from which it follows that:

$$I_1 + I_2 = 2I_0 \cdot (1 + \cos(\Phi_s))$$

With the Sagnac phase $\Phi_s$ (see equation 2) the following is obtained for $I^+ - I^-$:

$$I^+ - I^- = -2I_0 \cdot \sin(2\Phi_M) \cdot \sin(\Phi_s).$$

$I^+ + I^-$ becomes:

$$I^+ + I^- = 2I_0(1 + \cos(2\Phi_M) \cdot \cos(\Phi_s).$$

The complete $I^+ + I^- - (I_1 + I_2/2)$ signal can be used for controlling the deviation of the phase modulation to $\pi/4$ by means of a digital/analog converter (FIG. 5). The following is obtained at low rates of rotation ($\cos \approx 1$):

$$I_1 + I_2 \approx 4I_0$$

and thus $$I^+ + I^- - (I_1 + I_2)/2 = 2I_0(1 + \cos(2\Phi_M) \cdot \cos\Phi_s) - 2I_0$$
$$= 2I_0 \cdot \cos(2\Phi_M) \cdot \cos\Phi_s$$

Thus, the regulation of the phase modulator deviation must only be active at low rates of rotation. The following is obtained with a phase deviation of $\pi/4$:

$$I^+ - I^- = -2I_0 \cdot \sin(\Phi_s)$$

and thus the Sagnac phase is obtained as $$\Phi_s = \arcsin\left(\frac{I^+ - I^-}{I^+ + I^-}\right)$$

or $$\Phi_s = -2\arctan\left(\frac{I^+ - I^-}{I_1 + I_2}\right)$$

The arc sine (arcsin) or arc tangent (arctan) can be advantageously taken from a table in the signal processor, input via the processor software.

A digital division can be avoided if the optical signal from the light source 1 is regulated either by the light source current i(t) or by gain control of the readout signal amplifier (not shown for reasons of clarity) in such a manner that $$I^+ + I^-$$

remains constant (not shown in FIG. 5).

At very high rotation rates, the Sagnac phase $\Omega_s$ exceeds $\pi/2$. These transgressions can be detected by known software logic and taken into consideration in the output signal 22 from the microprocessor 21.

Figure 6:
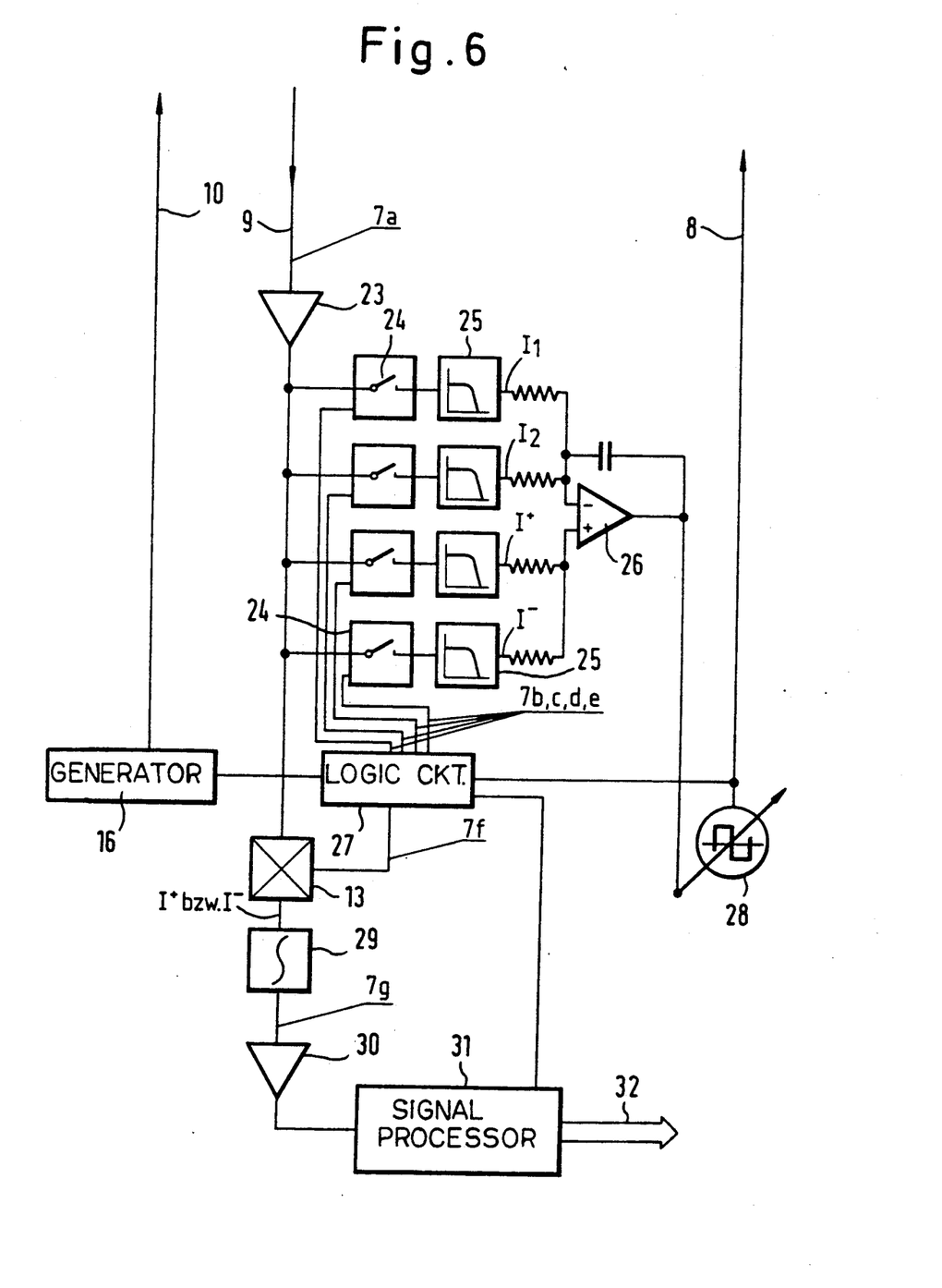
FIG. 6 is a schematic diagram of a further alternative embodiment of the invention, such embodiment offering inexpensive manufacture and operating in accordance with the dual-slope method.

FIG. 6 is a schematic diagram of an alternative to employing a signal processor. Rotation rate is measured in this embodiment by a method known as the "dual-slope method".

The phase modulator 6 is once again driven by the signal of FIG. 4a (i.e., about half the optimum frequency). The read-out signal at the photodetector 7, obtained by appropriately driving the light source 1 by the generator 16 as shown in FIG. 7a, is amplified by an amplifier 23 and supplied via four electronic switches 24, (whose drive signals are generated by a logic circuit 27 as switching timers shown in the waveforms of FIGS. 7b to 7e) to four low-pass filters 25 so that the signals $I^+$, $I^-$, $I_1$ and $I_2$ shown in FIG. 7a are obtained at their outputs. These four signals are calculated —as in the signal processor 21 of FIG. 5 —but now in an analog manner in an integrating amplifier 26 that is, at the same time, designed as regulator for the frequency generator 28 so that its amplitude is controlled in such a manner that $I^+ + I^- - (I_1 + I_2)2$ becomes essentially zero. Since high rates of rotation generally only occur for a short time, $\cos(\Phi_s) = 1$ is satisfied on average with a large control time constant.

Figure 7F:
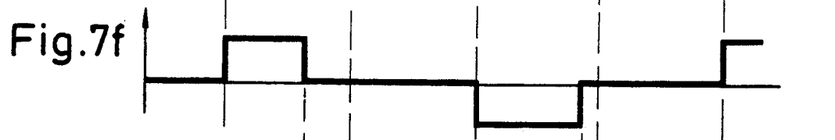
Figure 7G:
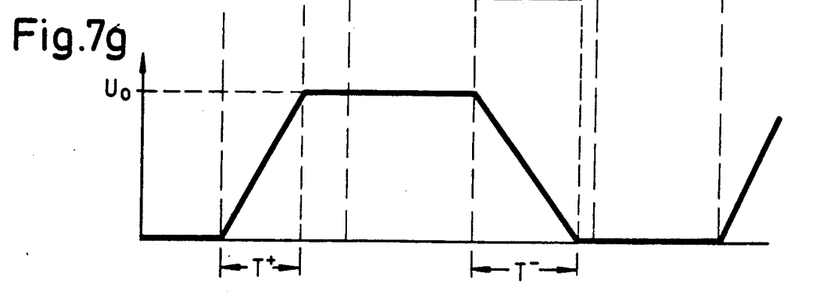

The square wave demodulator 13 is driven by the logic circuit 27 (c.f. signal variation, FIG. 7f) so that $I^+$ is applied with positive sign to an integrator 29 until a certain voltage $U^O$ is reached at the output, and then the signal $I^-$ with reversed sign until a zero transition of the output signal of the integrator 29 is again reached. FIG. 7g shows the variation of this signal. When the voltage $U^O$ or the zero transition of the voltage according to FIG. 7g is reached, this is detected by a comparator 30. The time periods of the signals $T^+$ and $T^-$ (FIG. 7g) are measured by means of counters (e.g., inside a signal processor 31) that also trigger the logic circuit 27. Then:

$$T^+/T^- = I^+/I^-$$

and thus $$I^+ - I^- = I_0\left(\frac{T^- - T^+}{T}\right).$$

With $T = T^+ + T^-$, the following is then obtained for the rotation rate:

$$\Phi_s = \arcsin\left(\frac{T^+ - T^-}{2T}\right).$$

This operation can also be performed by an interface processor of a higher-level computer system to obtain the rotation rate at an output of the processor 31 shown in the circuit diagram of FIG. 6.

Using the dual-slope method, the rotation rate can be determined with an accuracy of greater than 100 ppm analog/digital with a relatively small technical expenditure.

This method is also thus available for obtaining the term $I^+ - I^-$ required for scale factor stabilization for restoring gyroscope arrangements.

Alternatively, the $I^+$ and $I^-$ signals can be picked up and processed after the corresponding low-pass filters 25 in the circuit of FIG. 6.

The foregoing description is based on the assumption that the light source 1 is always used for gating in the light signals. As an alternative, the same effect can be achieved if the light in the interferometer is electro-optically interrupted at one or more places (with a continuously running light source 1) or if the read-out signal of the photodetector 7 is interrupted or set to zero at the appropriate times.

If the fiber comprising the coil 5 is very long, the required gyroscope modulation frequency (and the alternating frequency of the phase shift in the light source drive) becomes comparatively low. As a result, aliasing effects can occur with higher-frequency gyroscope signals. A remedy is available within the scope of the invention by a random control of the phase alternation of the light source drive. In this case, the evaluating electronics must in each case follow the current phase relationship with matching triggering.

The particular advantages of the invention include:

(1) The bandwidth of the photodetector 7 and of the signal amplifier electronics can be reduced by a factor of 100 to 1,000.

(2) The error signal is ideally optically gated, supported by the shape of the characteristic of the light source 1. As a result the gyroscope modulation frequency becomes non-critical, does not need to be corrected and can run synchronously with system frequencies.

(3) The demand on the specification for the permissible intensity of the amplitude modulation of the phase modulator is considerably reduced in significance.

(4) The modulation frequency and harmonics of the phase modulator 6 are not utilized in the evaluation electronics. As a result, inductive interference in the evaluation electronics is completely noncritical.

(5) The demodulator employed need only be slow; switching can be carried out relatively slowly during the gating-out periods. Because of the comparatively infrequent and slow switching, charge carrier injection poses no problem.

(6) In the case of digital demodulation, slow and very accurate A/D conversion methods, such as the inexpensive dual-slope method, can be employed.

(7) Gyroscope noise due to photon noise is not increased by the gating since the pulsed light source current can be selected to be much higher than the permissible continuous-operation diode current without loss of service life. Only the mean dissipation power in the light source 1 is significant to the service life with the duty factor used in each case.

Thus it is seen that the present invention provides an improved demodulation method and apparatus for a fiber-optic gyroscope. The invention achieves the improved method and apparatus in an easily controllable manner that permits the rotation rate signal to be obtained either directly or utilized to control the restoring sections of a restoring-type gyroscope.

The essential advantage of the invention lies in the fact that the signal processing frequency of the gyroscope electronics is no longer tied to the modulation frequency of the fiber gyroscope but can be much lower (for example lower by a factor of 1,000). This significantly increases the accuracy of the electronic evaluation.

The invention can be applied to both interferometer-type and resonator-type gyroscopes.

While this invention has been described with reference to its presently preferred embodiment, it is not limited thereto. Rather, the present invention is limited only insofar as described in the following set of claims and includes all equivalents thereof.

What is claimed is:

1. In the method for evaluating the rotation rate signal of a fiber-optic gyroscope, in which partial light beams are obtained from a light source by splitting a light beam and are radiated into a fiber coil in opposite directions and subjected to a periodic phase modulation the improvement comprising the steps of:

(a) modulating the fiber optic gyroscope with a rectangular modulation signal the period of which is an integral multiple of the fiber optic coil light transit time;
   (b) periodically gating the read-out signal of the fiber gyroscope prior to demodulation so that, during a time interval, corresponding to an integral multiple of the period of the phase modulation signal, only first predetermined phase sections of said periodic gyroscope output signal occur which phase sections are subjected to low-pass filtering to remove harmonic components of said modulation signal and to reduce signal noise;
   (c) controlling the gating of said read-out signal so that second predetermined phase sections of said periodic gyroscope output signals are sampled and subsequently low-pas filtered, said first and second phase sections together essentially making up the total of said periodic gyroscope output signal;
   (d) combining said low-pass filtered signals of said different phase sections to obtain said gyroscope rotation proportional signal 2. A method as defined in claim 1, further characterized in that:

a) the period of the phase modulation signal is approximately twice the transit time of the light in said fiber coil;
   b) the gating sequence of the read-out signal is alternated so that first phase sections with read-out signal referred to the positive phase deviation of the phase modulation signal and then phase sections with readout signal referred to the negative phase deviation are detected; and
   c) the rotation rate-proportional signal is output directly as a measure of the rotation rate.

3. A method as defined in claim 1, wherein the gating sequence is periodically alternated with a half-period duration of about 100 μs to 1ms.

4. A method as defined in claim 1, wherein the gating sequence is alternated at an aperiodic alternating frequency for avoiding aliasing effects.

5. A method as defined in claim 1, wherein the averaged signals from various phase sections are averaged with different signs during demodulation of the rotation rate signal.

6. A method as defined in claim 1, wherein:

a) the read-out signal components of various phase sections are supplied via sequentially drivable switches to low-pass filters; and
   b) the rotation rate is obtained from the averaged phase section signals.

7. A method as defined in claim 1, wherein:

a) said light source is operated with invariably identical light intensity; and
   b) said light source is gated with pulses whose period is slightly shorter than the transit time of the light in said fiber coil.

8. In a demodulator for the rotation-rate signal of a fiber-optical gyroscope, particularly a Sagnac interferometer, of the type in which a light beam emanating from a light source, conducted via a fiber path passes through a first directional coupler, one output of which is connected to a photodetector for the read-out signal and is split in a second directional coupler into two partial light beams that are radiated into a fiber coil in opposite directions and are periodically modulated by a phase modulator driven by a modulation signal generator, and in which the read-out signal of said photodetector is demodulated and output directly as rotation rate or used as a restoring signal in gyroscope electronics, the improvement comprising, in combination:

(a) said modulation signal generator being arranged to provide a rectangular modulation signal whose period is an integral multiple of the fiber optic coil light transit time;

(b) a switching signal generator for periodically gating the exciter signal of said light source so that, during a time interval that correspond to an integral multiple of the period of said phase modulation signal, only first predetermined phase sections of said periodic output signal of said gyroscope occur for further processing by said demodulation and evaluation circuit;

(c) a logic circuit for triggering said switching signal generator so that second predetermined phase sections of said periodic interferometer output signal are sampled and subsequently low-pass filtered, said first and second phase sections together essentially making up the total of said periodic gyroscope output signal; and (d) means for combining said low-pass filtered signals of said different phase sections to obtain said gyroscope rotation proportional signal 9. A device as defined in claim 8 wherein said gating signal sequence of said light source is periodically alternated with a half-period duration of 100 μs to 1 ms from the first to the second or further phase sections by said switching signal generator.

10. A device as defined in claim 8 wherein said phase modulation signal generator is a square wave signal generator.

11. A device as defined in claim 8 wherein:
a) said gating time intervals of the individual phase sections controlled by a logic circuit are of unequal lengths; and
b) said logic circuit synchronizes said reference frequency for said demodulator.

12. A device as defined in claim 8 wherein said read-out signal of said photodetector is applied to a sample-and hold circuit after low-pass filtering, subsequently digitized and supplied to a digital signal processor.

13. A device as defined in claim 12, further characterized in that:
a) said read-out signals of at least two phase sections are detected via switches synchronized to the time intervals of said phase sections and compared; and
b) said comparison is a measure of the phase deviation or serves as control signal for said phase modulator.

14. In the method for evaluating the rotation rate signal of a fiber-optic gyroscope in which partial light beams are obtained from a light source by splitting a light beam and are radiated into a fiber coil in opposite directions and subjected to a periodic phase modulation, the improvement comprising the steps of:
a) modulating the fiber optic gyroscope with a rectangular modulation signal, the period of which is an integral multiple of the fiber coil light transit time;
b) periodically gating the read-out signal of the fiber gyroscope with gating time periods that are essentially as long as the light transit time through the fiber coil such that, during a time interval, corresponding to an integral multiple of the period of the phase modulation signal, only first predetermined phase sections of the periodic gyroscope output signal occur which phase sections are subjected to low-pass filtering in order to remove harmonic components of the modulation signal and for reducing the signal noise;

c) controlling the gating of said read-out signal such that second predetermined phase sections of the said periodic gyroscope output signal are sampled and subsequently low-pass filtered, said first and second phase sections together essentially making up the total of said periodic gyroscope output signal;

d) combining the said low-pass filtered signals of the different phase sections in order to obtain the gyroscope rotation proportional signal;

e) the period of the phase modulation signal differing from twice the transit time of light for the fiber coil and preferably matched to about four times the transit time of the light through the fiber coil;

f) the gating sequence of the read-out signal being alternated so that first phase sections with read-out signal $I^+$ referred to the positive phase deviation of the phase modulation signal and then second phase sections with read-out signal $I_1$ referred to the light intensity, then third phase sections with read-out signal $I^-$ referred to the negative phase deviation of the phase modulation signal and then fourth phase sections with read-out signal $I_2$ referred to the light intensity are detected, and the averaged read-out signals referred to the first and third phase sections are demodulated as the rotation rate-proportional signal and the averaged read-out signals referred to the second and fourth phase sections are compared with the signals from the first and third phase section and used for modulator phase stabilization; and g) the rotation rate-proportional signal is output directly as a measure of the rotation rate.

15. A method as defined in claim 14 wherein the gating sequence is periodically alternated with a half-period duration of about 100 μs to 1ms.

16. A method as defined in claim 14 wherein the gating sequence is alternated at an aperiodic alternating frequency for avoiding aliasing effects.

17. A method as defined in claim 14 wherein the averaged signals from various phase sections are averaged with different signs during demodulation of the rotation rate signal.

18. A method as defined in claim 14 wherein:
a) the read-out signal components of various phase sections are supplied via sequentially drivable switches to lopass filters; and
b) the rotation rate is obtained from the averaged phase section signals.

19. A method as defined in claim 14 wherein:
a) said light source is operated with invariably identical light intensity; and
b) said light source is gated with pulses whose period is slightly shorter than the transit time of the light in said fiber coil.

* * * * *

UNITED STATES PATENT AND TRADEMARK OFFICE
CERTIFICATE OF CORRECTION

PATENT NO. : 5,133,600
DATED : July 28, 1992
INVENTOR(S) : Werner Schroder

It is certified that error appears in the above-indentified patent and that said Letters Patent is hereby corrected as shown below:

On the title page, prior to "References Cited", add

--Foreign Application Priority Data

June 2, 1989 [EP]  European Pat. Off....89119941.4--

Signed and Sealed this

Fourteenth Day of December, 1993

Attest:

BRUCE LEHMAN

*Attesting Officer*  *Commissioner of Patents and Trademarks*